United States Patent
Bagai et al.

(10) Patent No.: US 7,252,479 B2
(45) Date of Patent: Aug. 7, 2007

(54) ROTOR BLADE FOR A HIGH SPEED ROTARY-WING AIRCRAFT

(75) Inventors: Ashish Bagai, Hamden, CT (US); Robert C. Moffitt, Seymour, CT (US); Robert H. Blackwell, Jr., Monroe, CT (US); Timothy A. Krauss, Harwinton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 93 days.

(21) Appl. No.: 11/140,706

(22) Filed: May 31, 2005

(65) Prior Publication Data

US 2006/0269418 A1 Nov. 30, 2006

(51) Int. Cl.
*B64C 27/46* (2006.01)

(52) U.S. Cl. ............. 416/223 R; 416/238; 416/DIG. 2; 416/DIG. 5

(58) Field of Classification Search ............ 416/223 R, 416/228, 238, DIG. 2, DIG. 5
See application file for complete search history.

(56) References Cited

U.S. PATENT DOCUMENTS

| | | | | |
|---|---|---|---|---|
| 1,692,081 A | * | 11/1928 | La Cierva | 416/131 |
| 3,116,040 A | * | 12/1963 | Petrides et al. | 416/21 |
| 4,130,377 A | * | 12/1978 | Blackwell, Jr. | 416/132 R |
| 4,248,572 A | * | 2/1981 | Fradenburgh | 416/228 |
| 4,427,344 A | * | 1/1984 | Perry | 416/223 R |
| 4,880,355 A | * | 11/1989 | Vuillet et al. | 416/228 |
| 5,035,577 A | * | 7/1991 | Damongeot | 416/223 R |
| 5,137,427 A | * | 8/1992 | Shenoy | 416/223 R |
| 5,332,362 A | * | 7/1994 | Toulmay et al. | 416/223 R |
| 5,782,607 A | * | 7/1998 | Smith et al. | 416/224 |
| 5,879,131 A | * | 3/1999 | Arlton et al. | 416/223 R |
| 6,000,911 A | * | 12/1999 | Toulmay et al. | 416/223 R |
| 6,116,857 A | * | 9/2000 | Splettstoesser et al. | 416/228 |
| 6,364,615 B1 | | 4/2002 | Toulmay et al. | |

* cited by examiner

*Primary Examiner*—Igor Kershteyn
(74) *Attorney, Agent, or Firm*—Carlson, Gaskey & Olds

(57) ABSTRACT

A main rotor blade exhibiting a unique planform shape in which the blade chord increases from the root end of the blade inboard region to the outer main region of the blade, where the blade chord achieves a maximum chord at a spanwise location within the main region, then decreases toward a distal tip end. The leading edge preferably is generally straight while the trailing edge is contoured to define the chord. Another characteristic feature of the rotor blade design is the location of the blade-feathering axis in which the feathering axis is located at a mid chord position over some inboard length of the rotor blade then transitions to a quarter chord location. Another characteristic feature is an airfoil distribution along the blade span that transitions from a blunt trailing edge to a sharp trailing edge airfoil suited for mid-range Mach number operation. The tip region preferably utilizes a transonic flow airfoil. Another characteristic feature of the rotor blade design is an unconventional combination of positive and negative twist gradients.

40 Claims, 6 Drawing Sheets

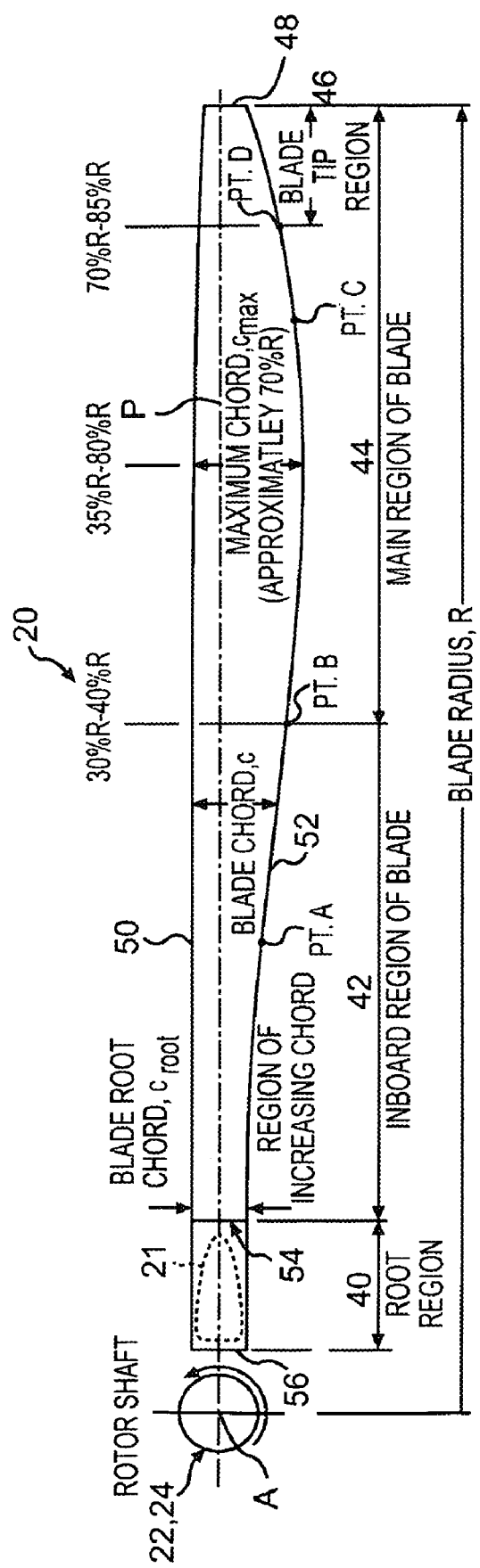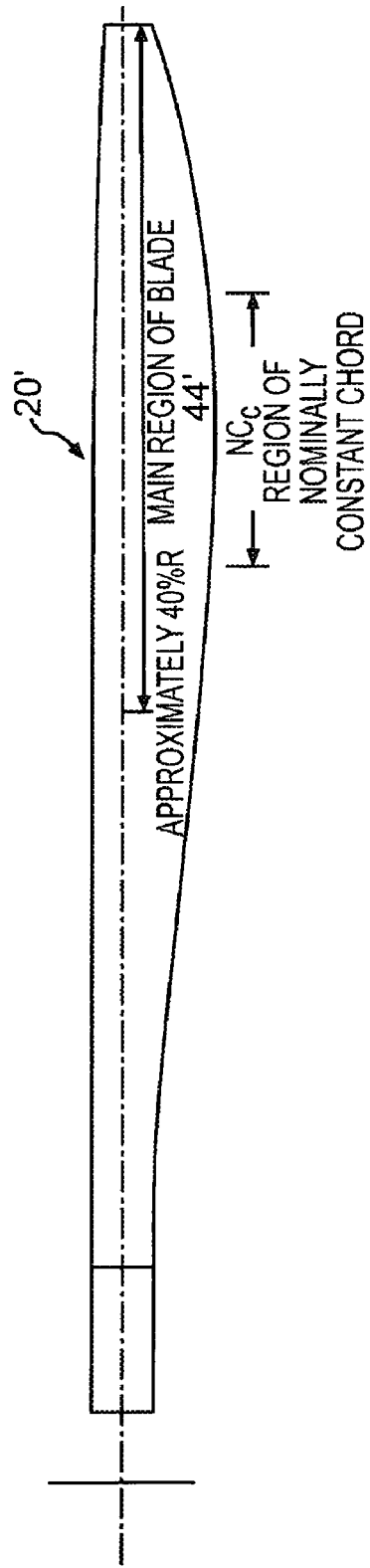
FIG. 2A
FIG. 2B

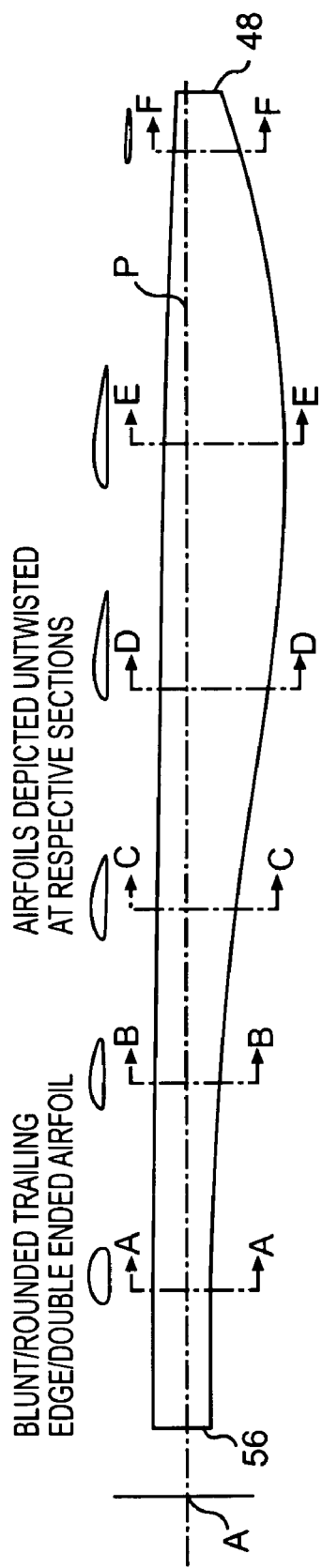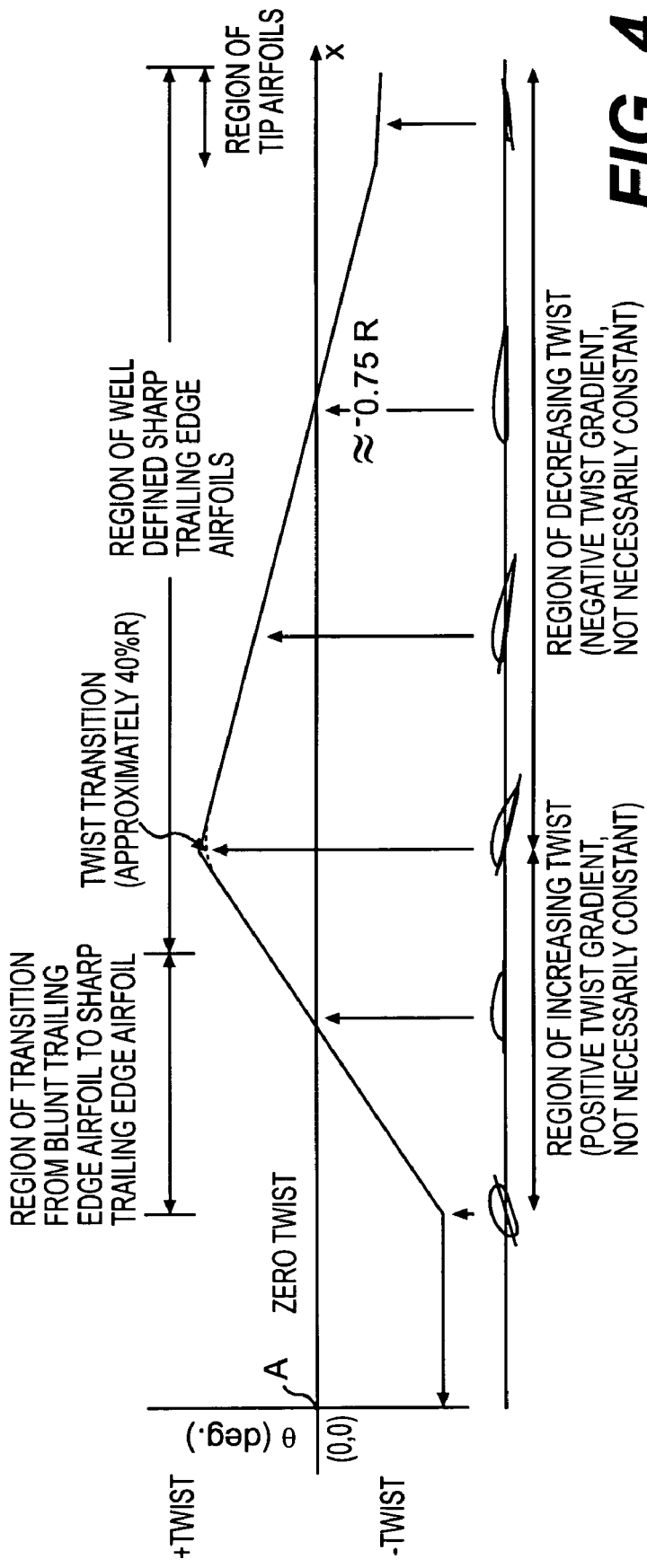

ROTOR BLADE FOR A HIGH SPEED ROTARY-WING AIRCRAFT

BACKGROUND OF THE INVENTION

The present invention is directed to a main rotor blade for rotary-wing aircraft and more particularly to a main rotor blade for a rigid coaxial, contra-rotating rotary-wing aircraft capable of hovering and cruising at speeds in excess of 250 kts.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Forward movement of the helicopter thereby generates a dissymmetry of lift between the advancing and retreating sides of the rotor. This dissymmetry may create an unstable condition if lift is not equalized across the advancing and retreating sides of the rotor.

A rotary wing aircraft with a contra-rotating rigid rotor system is capable of higher speeds compared to conventional single rotor helicopters due in part to the balance of lift between the advancing sides of the main rotor blades on the upper and lower rotor systems. In addition, the retreating sides of the rotors are also generally free from classic retreating blade stall that conventional single or tandem rotor helicopters may suffer from.

To still further increase airspeed, a rotary wing aircraft may incorporate an auxiliary translational propulsion system. Use of a coaxial contra-rotating rotor system in combination with an auxiliary translational propulsion system, allows a rotary-wing aircraft to attain significantly greater speeds than conventional rotary-wing aircraft, while maintaining hover and low speed capabilities.

One system significant to these flight attributes is the design of the main rotor, of which the rotor blades are the primary force and moment generating components. Design requirements for a rotary-wing aircraft incorporating a contra-rotating rotor system differ significantly from conventional rotary-wing aircraft. As with a conventional rotary-wing aircraft, the advancing blades of both the upper and lower rotors produce lift; however, unlike a conventional rotary-wing aircraft, the retreating blades of the contra-rotating rotor are off-loaded commensurate with increasing flight velocity, and need not produce lift to balance lateral (rolling) moments. Rather, roll equilibrium is attained by balancing the net effects of the equal and opposite moments produced by the advancing side blades of the counter-rotating rotors. The ability to off-load the retreating blades from producing lift alleviates retreating blade stall—a primary cause of speed limitation on conventional rotary wing aircraft—thereby permitting much greater forward flight speeds to be achieved.

Another consequence of high-speed flight is that the tip Mach number encountered by the advancing blades of a high speed rotary-wing aircraft is significantly higher than for conventional rotary-wing aircraft, while forcing the retreating blades on the contra-rotating rotor to operate in significant greater regions of reversed flow. Typically, conventional rotary-wing aircraft are limited to advance ratios of 0.4 to 0.45, encounter advancing side blade tip Mach numbers within 0.80 to 0.85, and typically have no more than 45% of the retreating blades immersed in reverse flow. High speed compound rotary wing aircraft are designed to attain advance ratios in excess of 1.0, and encounter advancing blade tip Mach numbers greater than 0.9. Without rotor RPM scheduling in which rotor tip speed is reduced with increasing flight velocity, the advancing side rotor blade tips may exceed sonic velocities. Moreover, significantly larger portions of the retreating blades are immersed in reversed flow at high speeds; typically as much as 80% at advance ratios of 0.8. Furthermore, blade loadings at high speeds, even under normal operating conditions, are significantly higher than for conventional rotary wing aircraft.

Thus, the aerodynamic operating environment of a high speed rotary-wing aircraft is significantly different than the operating environment encountered by conventional single or multi-rotor aircraft. Significantly different main rotor blade designs compared to more contemporary designs are therefore required.

Accordingly, it is desirable to provide a rotor blade for a high speed rotary-wing aircraft flight envelope that includes hovering and forward flight at speeds in excess of 250 kts.

SUMMARY OF THE INVENTION

A main rotor blade according to the present invention includes several geometric characteristics, including blade planform (chord), thickness, airfoil and twist distributions. The design is an outcome of optimizing rotor performance and high-speed flight efficiency, while satisfying structural and aeroelastic requirements throughout an anticipated flight envelope of a high speed rotary-wing aircraft. The main considerations of the blade design are: a) minimizing advancing side compressibility effects (drag), b) reducing retreating side blade drag, c) designing the rotor with sufficient blade area (solidity), d) maintaining blade aeroelastic stability and, e) maintaining blade tip separations between the upper and lower rotors.

Advancing side compressibility effects are minimized through the selection of airfoils, thickness distribution, twist, blade sweep and rotor speed scheduling with flight velocity. Retreating side blade drag in reversed flow is minimized by the redistribution of blade chord from inboard regions to outer spanwise locations, twist tailoring and incorporating particular airfoils designed to minimize drag under reversed flow conditions. Blade area (rotor solidity) maximizes operating design point performance efficiency while maintaining sufficient maneuver margin. The design parameters are defined to ensure that blade aeroelastic and tip clearance requirements are satisfied as ascertained from independent structural-dynamic and aeroelastic analyses, along with bearing design manufacturing considerations.

The main rotor blade of the present invention exhibits a unique planform shape in which the blade chord increases from the root end of the blade inboard region to the outer main region of the blade. The chord achieves a maximum dimension at a spanwise location within the main region, and then decreases toward the distal tip end. The chord distribution of the blade is one in which the chord increases smoothly from the root region to the maximum chord location within the main region following a continuous curve. The main region of the blade is also a smooth curve which tapers smoothly down to the tip chord.

Another characteristic feature of the rotor blade design is the location of the blade-feathering axis in which the feathering axis is located at a mid chord position over some inboard length of the rotor blade then transitions to a quarter chord location. The mid chord location within the root region and inboard regions of the rotor blade facilitates blade structural property distributions and manufacturing design considerations.

Another characteristic feature of the rotor blade design is an airfoil distribution along the blade span that transitions from a blunt trailing edge airfoil suited to operating in reversed flows to a sharp trailing edge airfoil suited for mid-range Mach number operation. The tip region preferably utilizes a transonic flow airfoil. The root end region with a blunt trailing edge, tapers into the sharp trailing edge.

Another characteristic feature of the rotor blade design is an unconventional combination of positive and negative twist gradients.

The various blade characteristics disclosed herein may be utilized singularly or in any combination depending on the particular design requirements of the aircraft.

The present invention therefore provides a rotor blade for a high speed rotary-wing aircraft flight envelope which includes hovering and forward flight at speeds in excess of 250 kts.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a plan view of a rotor blade designed according to the present invention;

FIG. 2B is a plan view of another rotor blade designed according to the present invention with a nominally constant chord section;

FIG. 3 is a plan view of a rotor blade designed according to the present invention illustrating sectional views showing blunt trailing edge and sharp trailing edge airfoil sections along the span of an untwisted blade;

FIG. 4 is a graphical representation of airfoil twist gradient characteristic and associated pitch orientation of the airfoil sections along the span of the blade;

DETAILED DESCRIPTION OF THE PREFERRED EMBODIMENT

Figure 1:
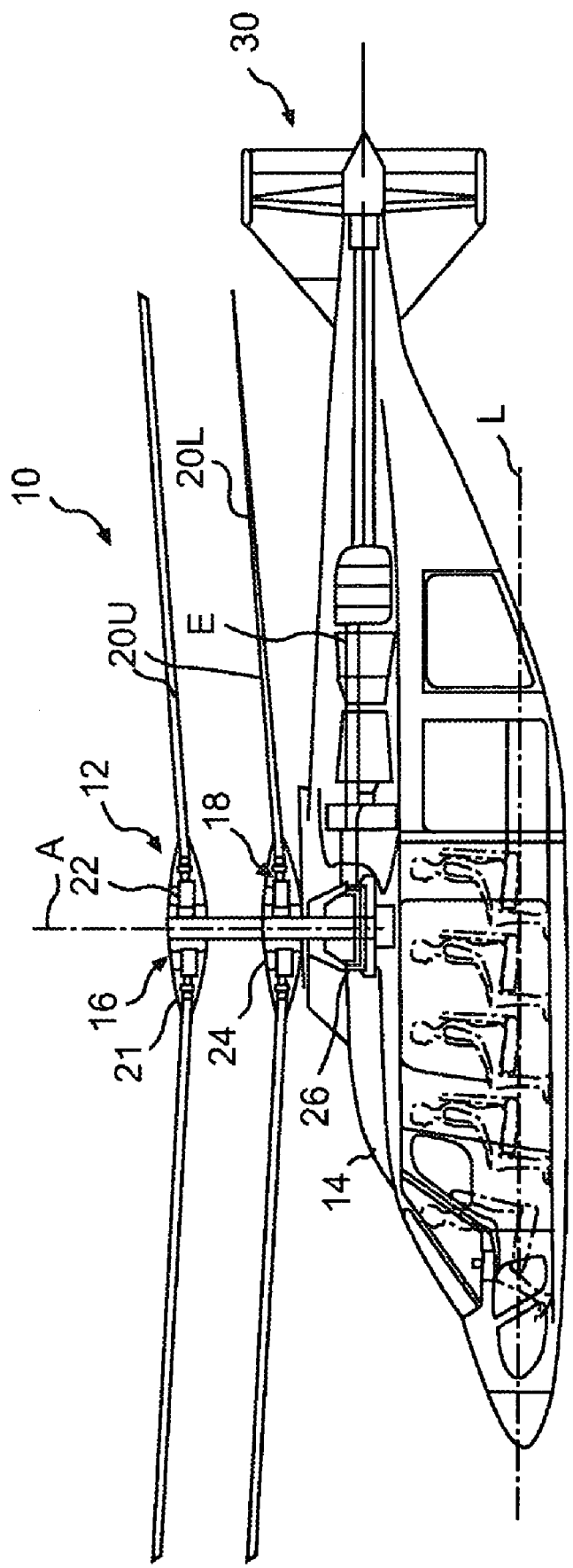
FIG. 1 is a general schematic view of an exemplary rotary wing aircraft embodiment for use with a coaxial rigid counter rotating rotor system incorporating the blades of the present invention.

FIG. 1 illustrates an exemplary vertical takeoff and landing (VTOL) high speed compound rotary-wing aircraft 10 having a dual, contra-rotating, coaxial rotor system. 12. The aircraft 10 includes an airframe 14 that supports the rotor system 12 as well as a propulsive system 30 which provides translational thrust generally parallel to an aircraft longitudinal axis L. Although a particular aircraft configuration is illustrated in the disclosed embodiment, other machines such as single rotor helicopters, turbo-props, tilt-rotor and tilt-wing aircraft will also benefit from the present invention.

The rotor system 12 includes a first rotor system 16 and a second rotor system 18. Each rotor system 16 and 18 includes a plurality of rotor blades 20 mounted to a rotor hub assembly 22, 24 for rotation about a rotor axis of rotation A. The plurality of the main rotor blades 20 project substantially radially outward from each of the hub assemblies 22, 24 and are supported therefrom in one of numerous attachments arrangements typically including a blade cuff (illustrated schematically at 21). Any number of blades 20 may be used with the rotor system 12. The rotor system 12 is driven by a main gearbox 26 that is driven by one or more engines.

FIG. 2A illustrates a general plan view of one rotor blade 20 designed according to the present invention which illustrates the basic chord distribution and the distribution of blade area relative to blade span. The rotor blade 20 can generally be divided into a root region 40, an inboard region 42, a main region 44, and a tip region 46. The root, inboard, main, and tip regions 40, 42, 44, 46 define the span of the rotor blade 20 and define a blade radius R between the axis of rotation A and a distal tip end 48 of the blade tip region 46. The rotor blade 20 defines a leading edge 50 and a trailing edge 52, which define the chord C of the rotor blade 20. A pitching or feathering axis P is the axis about which aerodynamic blade twist primarily occurs.

The blade region extending inboard of approximately 30% R, and preferably inboard of 15% R, defines the root region 40 and includes the blade to hub attachment system (schematically illustrated in FIG. 1). Notably, the rotor blade 20 is mounted along the root region 40 so that the root region 40 has comparatively minimal aerodynamic significance since it is typically at least partially enclosed within the blade cuff 21 (illustrated schematically in FIG. 1). The blade cuff mounts the rotor blade 20 to the rotor hub assembly 22, 24 by any means known in the art and thus further detailed discussion need not be provided herein. The region of the blade that lies between the root end 54 and main region 44 of the blade 20 is the inboard region 42.

Figure 2C:
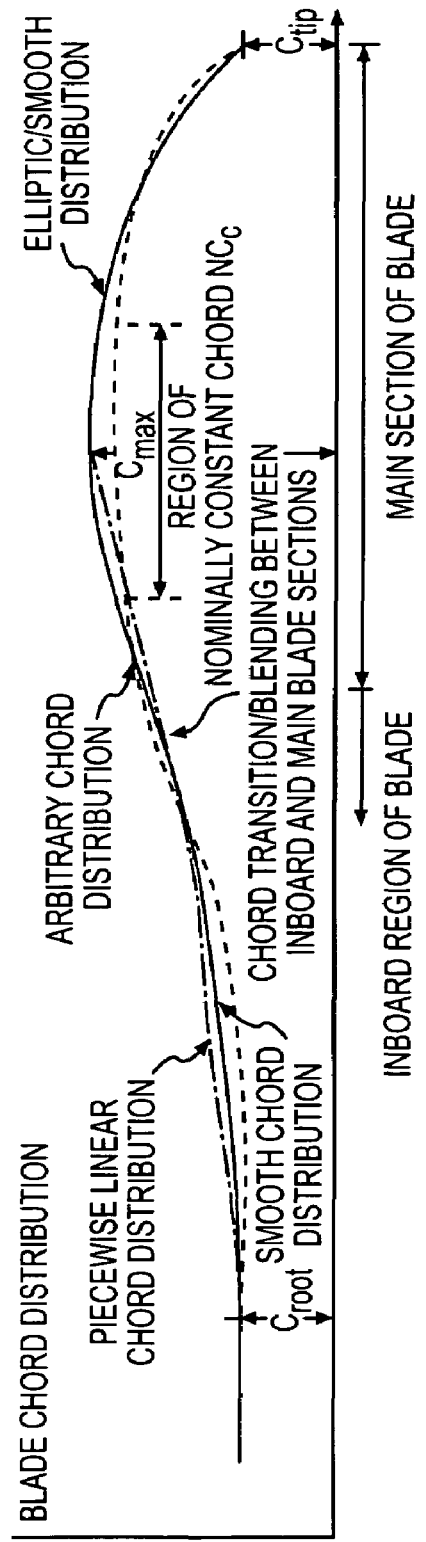
FIG. 2C is a graphical representation of a blade chord distribution characteristic.

The blade design exhibits a unique shape in which the blade chord c may begin to increase adjacent the root region 40 over the length of the inboard region 42 and into the main region 44 of the blade 20, achieves a maximum chord $c_{max}$ at a spanwise location within the main region 44, and then the blade chord C decreases toward the distal tip end 48. Preferably, the leading edge 50 is generally straight while the trailing edge 52 is contoured to define the changing blade chord c. The blade chord distribution of the blade 20 is one in which preferably the blade chord c increases smoothly from the root region 40 to the maximum chord $c_{max}$ following a continuous curve, and in which the main region 44 of the blade is also a smooth curve which then smoothly tapers to the tip chord $c_{tip}$ (FIG. 2C).

In one illustration of the blade chord distribution, points A, B, C, and D shall be defined along the blade trailing edge 52. Point A and Point B are located within the inboard region 42 while point C and point D are located within the main region 44. Point A and Point B are located inboard of the main rotor blade maximum $c_{max}$ while point C and point D are located outboard of the main rotor blade maximum chord $c_{max}$. The blade chord increases between point A and point B and decreases between point C and point D. The main rotor blade maximum chord $c_{max}$ is located somewhere between point B and point C. Alternatively, the span between point B and point C may include a section of nominally constant chord $NC_c$ such that the trailing edge and the leading edge are generally parallel between point B and point C, yet include the maximum chord $C_{max}$. It should be understood that the location of points A, B, C, and D may be distributed over various spans and sections of the main rotor blade and that the location of points A, B, C, and D in FIG. 2A are for illustrative purposes only and should not be considered otherwise limiting. Furthermore, it should be understood that the span between point A and point B as well as the span between point C and point D may be located at various positions along the blade span as well as include sections of equivalent or different spans.

The position of the maximum chord $c_{max}$ is between 35% R and 85% R, preferably between 55% R and 80% R, and more preferably between 65% R and 75% R. The ratio of the root chord $c_{root}$ to maximum chord $c_{max}$ (FIG. 2C) is between 0.2 and 1.0, preferably between 0.3 and 0.8, and more preferably between 0.5 and 0.75. The ratio of tip chord $c_{tip}$ to maximum chord $c_{max}$ is anywhere from 0 to 1.0, but is preferably between 0.25 and 0.8.

The main region 44 of the blade 20 is the primary aerodynamic portion of the rotor blade 20 inclusive of the tip region 46. The main region 44 is defined to extend from 30% R to 100% R, but more preferably from 40% R to 100% R (FIG. 2A). The main region 44 preferably defines an elliptical distribution of blade area over span, although other distributions, such as, but not limited to parabolic or polygon distributions may also be utilized. One such alternative distribution includes a main region 44' in which a section of nominally constant chord $NC_c$ (FIG. 2B) is prescribed over a portion of the main region 44' of the blade 20' such that the trailing edge and leading edge are generally parallel over this section.

Referring to FIG. 2C, it is recognized that while the geometries depicted illustrate smooth and continuous transitions (solid line) between the inboard region 42 and main region 44 of the rotor blade 20, this transition need not be smooth or continuous. The Elliptic/Smooth chord distribution (solid line) is comparable to an arbitrary smooth chord distribution, except that "Elliptic" specifically implies a chord distribution that is defined mathematically as an ellipse.

A piecewise linear chord distribution (dash-dot line) over the inboard region 42 is alternatively represented from the root chord $c_{root}$ to maximum chord $c_{max}$. The smooth chord distribution (solid line) is preferably from the root chord $c_{root}$ to the tip chord $c_{tip}$ with an elliptic chord variation over the main region 44 and tip region 46 with a smooth chord distribution over the inboard region 42. An "arbitrary chord distribution" including a section with nominally constant chord $NC_c$ is illustrated in FIG. 2C as a dashed line. The solid line, dashed line and dot-dash lines indicate that the chord variation over the span need not necessarily be smooth, or necessarily defined by a rigorous mathematical equation (ellipse, polynomial or any other equation). In other words, the chord variations may be smooth with mathematical definition (solid), a series of straight segments (multi-step piecewise distributions) (dot-dash line) or defined arbitrarily smooth, but not specifically mathematically smooth (dash). A section of constant chord $NC_c$ (dash line and FIG. 2B) may also adjust the distribution as noted by the variation near an inboard beginning of the region of nominally constant chord $NC_c$. "Arbitrary main chord variation" as defined herein is a blending of a series of points, not necessarily using a mathematical expression. It should be understood that FIG. 2B depicts an alternative representation of the blade planform 20' (area distribution with span), but still designed in accordance with the teachings of the present invention.

The blade tip region 46 typically lies over the outer 15% R to 30% R (70% R-100% R to 85% R to 100% R) of the rotor blade 20. The tip region 46 may be defined by several design characteristics that differentiate it from the main region 44, such as, for example, a transition to transonic airfoils, changes in twist and the incorporation of other geometric characteristics such as sweep, dihedral, and anhedral.

Figure 2D:
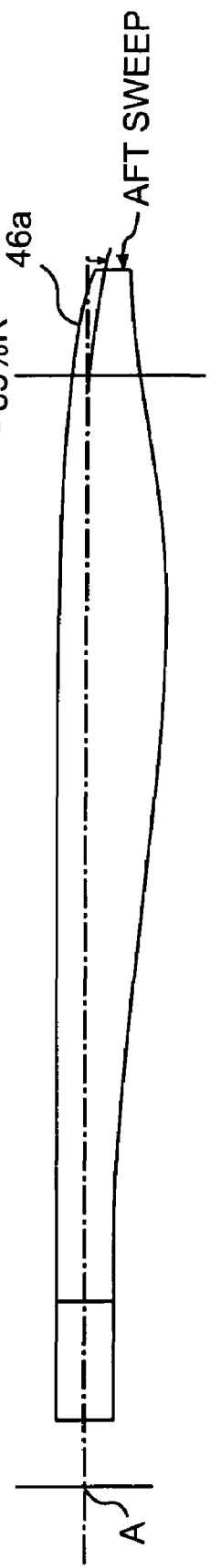
FIG. 2D is a plan view of another rotor blade designed according to the present invention with an aft swept tip.
Figure 2E:
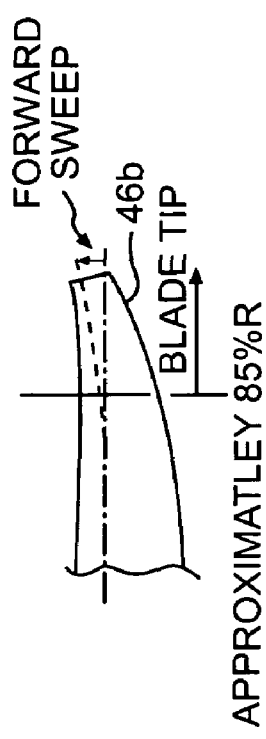
FIG. 2E is a plan view of another rotor blade designed according to the present invention with a forward swept tip.
Figure 2F:
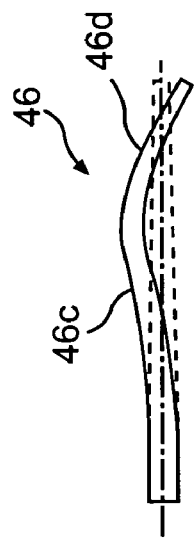
FIG. 2F is a trailing edge view of another rotor blade designed according to the present invention with dihedral/anhedral tip.

In FIGS. 2A-2C, the tip region 46 is generally straight. Notably, the blade tip region 46 may taper at both the leading edge 50 and the trailing edge 52, however either may be tapered alone. Alternatively, the tip region 46 may be swept aft 46a (FIG. 2D) or swept forward 46b (FIG. 2E). Furthermore, the tip region 46 may include a dihedral section 46c, an anhedral section 46d or a combination thereof as defined when observed from a trailing edge view (FIG. 2F). It should be understood that various combinations of these tip characteristics may be utilized such as straight tips with anhedral, forward or aft swept tips with combined dihedral and anhedral, as well as others. Furthermore, continuously varying or multi-step piecewise distributions may also be utilized with the present invention as various radial segmentations of the blade tip region 46 that include sweep and dihedral/anhedral. Various sweep and dihedral/anhedral angles may are also be utilized.

Figure 2G:
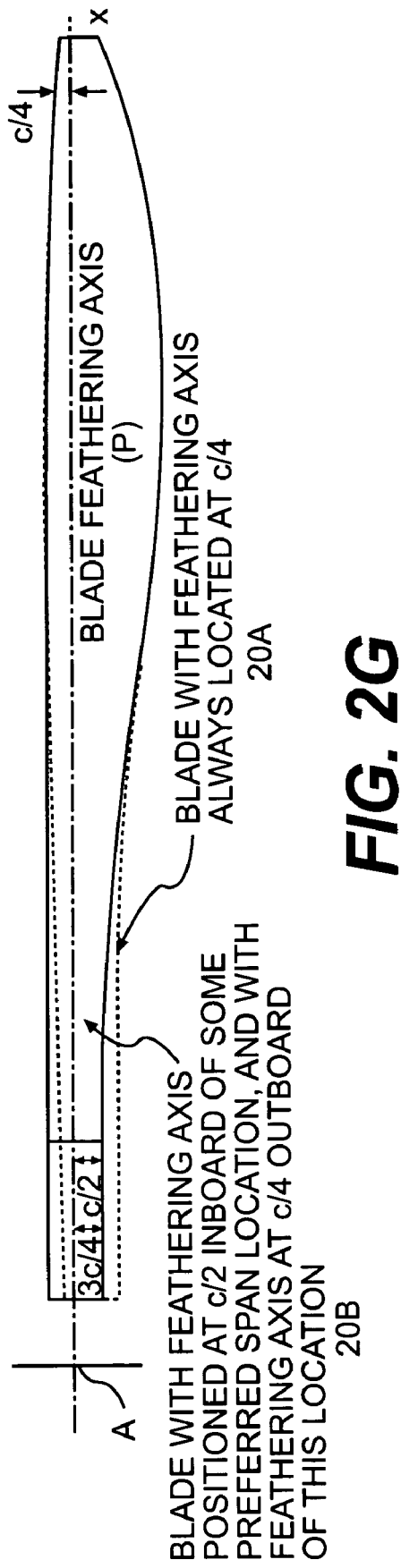
FIG. 2G is a plan view of a rotor blade designed according to the present invention illustrating alternative feathering axis position characteristics.

Referring to FIG. 2G, another characteristic feature of the rotor blade 20 designed according to the present invention is the location of the blade-feathering axis P. FIG. 2G illustrates the rotor blade 20 in plan view with the feathering axis P located in alternative positions. In one rotor blade 20A (dashed outline), the blade 20A defines the feathering axis P at the quarter chord (c/4) position as traditionally located on conventional rotor blades such that the feathering axis P nominally coincides with the location of the airfoil aerodynamic center of the blade section along the entire span.

In another rotor blade 20B (solid outline), the feathering axis is located at a mid chord (c/2) position over some inboard length of the rotor blade 20B and then transitions to the quarter chord (c/4) location. The feathering axis is positioned at c/2 inboard of 40% R, and more preferably inboard of 30% R. The transition from the c/2 location to the c/4 location is defined to occur over a spanwise distance of 5% R to 50% R, but preferably over a spanwise distance of 10% R to 20% R. Over this transition distance, the feathering axis P is progressively shifted from the mid chord c/2 to the quarter chord line c/4, such that at the outboard 30% R to 50% R of the blade 20, the feathering axis P is located at the sectional quarter chord c/4. The mid chord (c/2) location within the root region 40 and inboard regions 42 of the rotor blade 20B facilitates blade structural property distributions and manufacturing design considerations.

Referring to FIG. 3, the airfoil distribution along the blade span is illustrated in progressive root to tip sections A-A to F-F. The rotor blade 20 preferably incorporates an airfoil distribution that changes from the root region 40 to the inboard region 42, the inboard region 42 to the main region 44, and from the main region 44 to the tip region 46. Typical blade cross-sections A-A to F-F taken along the blade span transverse to the feathering axis P illustrate the exemplary airfoils shown at zero pitch attitude in FIG. 3.

Within the root region 40 of the rotor blade 20, and in particular at the blade root end 54 section A-A, the airfoil preferably includes a narrow chord and is relatively thick with particularly blunt trailing edges. The blunt trailing edge airfoils are preferably positioned between a distal root end 56 and approximately 35% R. Further outboard and typically within the inboard region 42 (FIGS. 2A and 5B), the airfoil shape transitions toward an airfoil (sections B-B and C-C) with a relatively sharp trailing edge profile prior to merging with the main region 44 of the rotor blade 20. The transition from the blunt trailing edge to the sharp trailing edge airfoil occurs in the region that lies approximately between 30% R and 50% R (illustrated from the trailing edge in FIG. 5B). The main region 44 of the blade preferably utilizes airfoils (sections D-D and E-E) having sharp trailing edge airfoils suited for mid-range Mach number operation. The tip region 46 preferably utilizes a transonic flow airfoil (section F-F).

Referring to FIG. 4, another characteristic of the rotor blade 20 is a blade twist distribution. The rotor blade 20 preferably incorporates an unconventional combination of positive and negative twist gradients. That is, from the root end 54 to approximately 35% R to 50% R, the blade preferably incorporates a positive twist gradient beginning with a negative twist at the root end 54. The twist rate over this region, however, need not be of constant rate, but may vary according to some smooth distribution, and/or include piecewise varying segments.

The twist over the main region 44 extending from 35% R to the start of the tip region 46 has a negative twist rate that may be constant, piecewise varying or continuously varying. The twist over the tip region 46 may be positively varying, negatively varying, constant or a combination. The blade twist of the airfoils at the blade cross-sections in FIG. 4 generally correspond to the cross-sections as illustrated in FIG. 3 pictorially depict the relative blade twist at each section A-A to F-F.

Figure 5A:
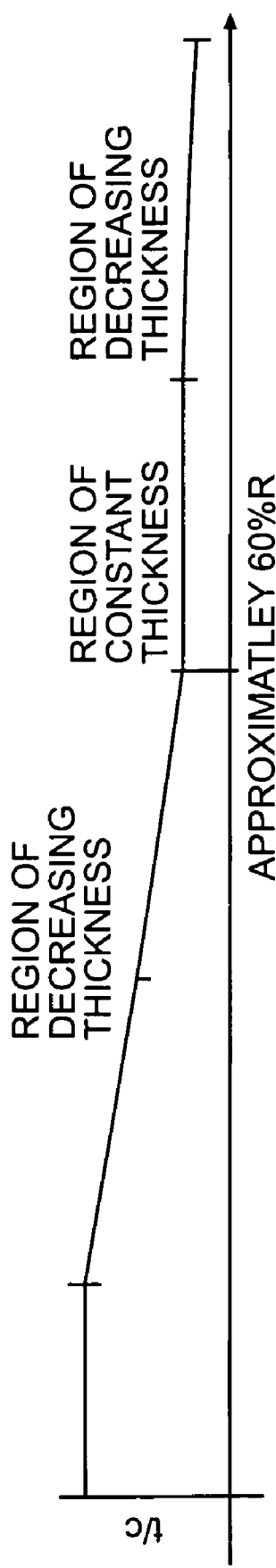
FIG. 5A is a blade thickness distribution characteristic of a rotor blade designed according to the present invention illustrating an airfoil thickness to chord ratio (t/c) characteristic.
Figure 5B:
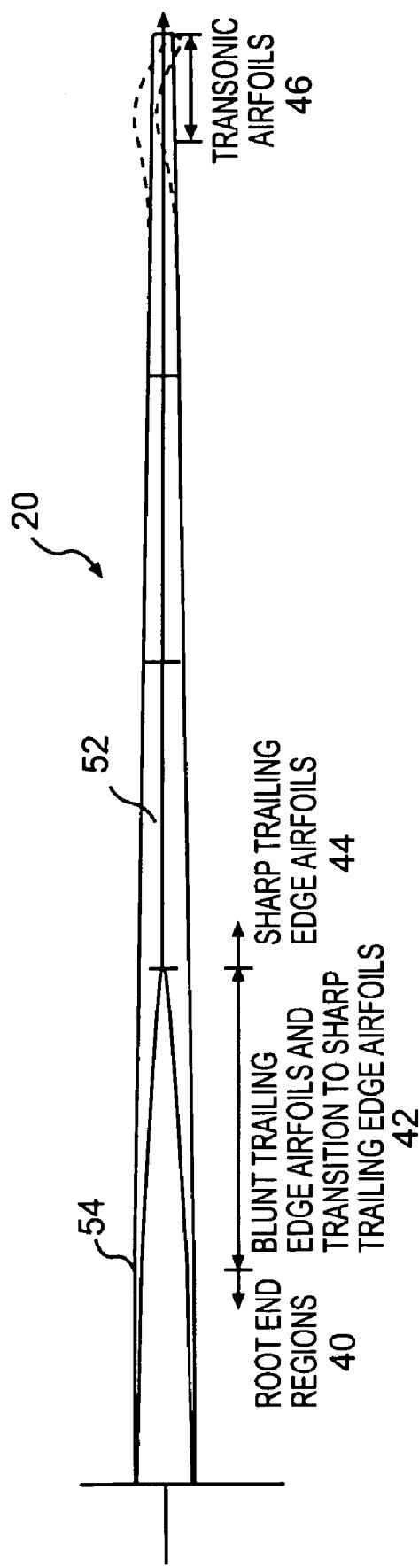
FIG. 5B is a trailing edge view of a rotor blade designed according to the present invention illustrating the blade thickness distribution characteristic.

Referring to FIG. 5A, a blade thickness distribution characteristic of the rotor blade 20 is illustrated. The non-dimensional airfoil thickness to chord ratios (t/c), are graphically represented in FIG. 5A to generally correspond with a rear view of the trailing edge of the rotor blade 20 (FIG. 5B). The non-dimensional and dimensional variations are related directly to the airfoil distributions discussed previously, and serve to further illustrate the distribution of blade structural and aerodynamic properties. Notably, the root end region 40 is generally of constant thickness with a blunt trailing edge which tapers into a sharp trailing edge.

It should be understood by one of ordinary skill in the art, the various blade characteristics disclosed herein may be utilized singularly or in any combination depending on the particular design requirements of the aircraft. Moreover, although the invention has been generally described in connection with a rotary wing aircraft having counter-rotating rotors, the inventions is equally applicable to any aircraft including, but not limited to, single rotor helicopters, high-speed compound rotary wing aircraft, tilt-rotors, and such like.

It should be understood that relative positional terms such as "forward," "aft," "upper," "lower," "above," "below," "inboard," "outboard," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main rotor blade assembly for a rotary wing aircraft comprising:
   a main rotor blade root region containing a root attachment chord taken within said main rotor blade root region transverse to a feathering axis;
   a main rotor blade inboard region outboard of said main rotor blade root region, said main rotor blade inboard region containing an inboard chord within said main rotor blade inboard region transverse to said feathering axis;
   a main rotor blade main region outboard of said main rotor blade inboard region, said main rotor blade main region containing a main rotor blade maximum chord within said main rotor bade main region transverse to said feathering axis;
   a main rotor blade tip region outboard of said main region, said tip region containing a tip region chord within said main rotor blade tip region transverse to said feathering axis; and
   a blade chord defined between a leading edge and a trailing edge, said trailing edge defined along a root trailing edge of said main rotor blade root region, an inboard region trailing edge of said inboard main rotor blade inboard region, a main region trailing edge of said main rotor blade main region and a tip region trailing edge of said main rotor blade tip region, said inboard region trailing edge defining a point A and a point B, said point B outboard of said point A, said main region trailing edge defining a point C and a point D, said point D outboard of said point C, said blade chord increasing between said point A and said point B and decreasing between said point C and said point D, said main rotor blade maximum chord located between said point B and said point C.

2. The main rotor blade assembly as recited in claim 1, wherein said maximum chord is located between 35% R and 85% R of a rotor blade span defined from an axis of rotation of said rotor blade to a distal end of said main rotor blade tip region.

3. The main rotor blade assembly as recited in claim 1, wherein a ratio of said root attachment chord to said maximum chord is between 0.2 and 1.0.

4. The main rotor blade assembly as recited in claim 1, wherein a ratio of said tip chord to said maximum chord is between 0.25 and 0.8.

5. The main rotor blade assembly as recited in claim 1, wherein said main rotor blade main region and said main rotor blade tip region extend from 30% R to 100% R of a rotor blade span defined from an axis of rotation of said rotor blade to a distal end of said main rotor blade tip region.

6. The main rotor blade assembly as recited in claim 5, wherein said main rotor blade main region defines an elliptical distribution of blade area over main region length.

7. The main rotor blade assembly as recited in claim 5, wherein said main rotor blade main region defines a section of nominally constant chord over a portion of said main rotor blade main region.

8. The main rotor blade assembly as recited in claim 1, wherein said main rotor blade root region extends from 0% R to 30% R of a rotor blade span defined from an axis of rotation of said rotor blade to a distal end of said main rotor blade tip region.

9. The main rotor blade assembly as recited in claim 1, wherein said main rotor blade tip region extends from 70% R to 100% R of a rotor blade span defined from an axis of rotation of said rotor blade to a distal end of said main rotor blade tip region.

10. The main rotor blade assembly as recited in claim 9, wherein said main rotor blade tip region includes a tapered tip section.

11. The main rotor blade assembly as recited in claim 9, wherein said tip region includes a swept tip section.

12. The main rotor blade assembly as recited in claim 9, wherein said main rotor blade tip region includes an anhedral section.

13. The main rotor blade assembly as recited in claim 9, wherein said main rotor blade tip region includes a dihedral section.

14. The main rotor blade assembly as recited in claim 1, wherein at least a segment of said feathering axis is positioned at a mid chord location from 0% R to 40% R of a rotor blade span defined from an axis of rotation of said rotor blade to a distal end of said main rotor blade tip region.

15. The main rotor blade assembly as recited in claim 14, wherein said feathering axis begins a transition from said mid chord location to a quarter chord location over a spanwise distance of 5% R to 50% R.

16. The main rotor blade assembly as recited in claim 1, wherein said root attachment section defines a blunt trailing edge airfoil shape and said main region section defines a sharp trailing edge airfoil shape, said blunt trailing edge airfoil shape transitions to said sharp trailing edge airfoil shape within said main rotor blade inboard region.

17. The main rotor blade assembly as recited in claim 1, wherein said main rotor blade tip region section includes a transonic airfoil shape.

18. The main rotor blade assembly as recited in claim 1, wherein a positive twist gradient is defined between 0% R to 50% R of a rotor blade span defined from an axis of rotation of said rotor blade to a distal end of said main rotor blade tip region.

19. The main rotor blade assembly as recited in claim 18, wherein said positive twist gradient transitions to a negative twist gradient at approximately 40% R.

20. The main rotor blade assembly as recited in claim 18, wherein a 0 degree twist occurs at approximately 75% R.

21. The main rotor blade assembly as recited in claim 1, wherein said main rotor blade root region is inboard of 15% R.

22. The main rotor blade assembly as recited in claim 1, wherein said main rotor blade root region is inboard of 30% R.

23. The main rotor blade assembly as recited in claim 1, wherein said main rotor blade tip region is outboard of 85% R.

24. The main rotor blade assembly as recited in claim 1, wherein said point B is located at 35% R and said point C is located at 85% R.

25. The main rotor blade assembly as recited in claim 1, wherein said point B is located at 55% R and said point C is located at 80% R.

26. The main rotor blade assembly as recited in claim 1, wherein said point B is located at 65% R and said point C is located at 75% R.

27. The main rotor blade assembly as recited in claim 1, wherein a nominally constant chord $NC_c$ is between said point B and said point C.

28. The main rotor blade assembly as recited in claim 1, wherein said point A is located outboard of 30% R.

29. The main rotor blade assembly as recited in claim 1, wherein said point A is located outboard of 15% R.

30. The main rotor blade assembly as recited in claim 1, wherein said point D is located inboard of 85% R.

31. The main rotor blade assembly as recited in claim 1, wherein said root attachment chord is generally consistent over the span of said main rotor blade root region.

32. The main rotor blade assembly as recited in claim 1, wherein said main region defines an elliptical distribution.

33. The main rotor blade assembly as recited in claim 1, wherein a transition between said inboard region and said main region includes an increasing arbitrary chord distribution.

34. The main rotor blade assembly as recited in claim 1, wherein a transition between said inboard region and said main region includes an increasing piecewise linear chord distribution.

35. The main rotor blade assembly as recited in claim 1, wherein a transition between said inboard region and said main region includes an increasing smooth chord distribution.

36. The main rotor blade assembly as recited in claim 1, wherein said blade chord between said point A and point B increases from said feathering axis to said trailing edge.

37. The main rotor blade assembly as recited in claim 1, wherein said blade chord between said point C and point D decreases from said feathering axis to said trailing edge.

38. The main rotor blade assembly as recited in claim 1, wherein said blade chord between said point A and point B increases from said feathering axis to said trailing edge and said blade chord between said point C and said point D decreases from said feathering axis to said trailing edge to define an elliptical distribution.

39. A main rotor blade assembly for a rotary wing aircraft comprising:
   a blade chord defined between a leading edge and a trailing edge of a main rotor blade having a main rotor blade root region, a main rotor blade inboard region outboard of said main rotor blade root region, a main rotor blade main region outboard of said main rotor blade inboard region and a main rotor blade tip region outboard of said main rotor blade main region;
   said trailing edge defined through a root trailing edge of said main rotor blade root region, an inboard trailing edge of said main rotor blade inboard region, a main region trailing edge of said main rotor blade main region and a tip region trailing edge of said main rotor blade tip region;
   said blade chord increasing within said main rotor blade main region inboard of a main rotor blade maximum chord contained within said main rotor blade main region then decreasing within said main rotor blade main region outboard of said main rotor blade maximum chord.

40. A main rotor blade assembly for a rotary wing aircraft comprising:

a blade chord defined between a leading edge and a trailing edge of a main rotor blade having a main rotor blade root region, a main rotor blade inboard region outboard of said main rotor blade root region, a main rotor blade main region outboard of said main rotor blade inboard region and a main rotor blade tip region outboard of said main rotor blade main region;

said trailing edge defined through a root trailing edge of said main rotor blade root region, an inboard trailing edge of said rotor blade inboard region, a main region trailing edge of said main rotor blade main region and a tip region trailing edge of said main rotor blade tip region;

said blade chord increasing between said feathering axis and said trailing edge within said main rotor blade main region inboard of a main rotor blade maximum chord contained within said main rotor blade main region then decreasing between said feathering axis and said trailing edge within said main rotor blade main region outboard of said main rotor blade maximum chord, said main rotor blade maximum chord located between 65% R and 75% R of a rotor blade span defined from an axis of rotation of said rotor blade to a distal end of said main rotor blade tip region to define an elliptical distribution.

* * * * *

UNITED STATES PATENT AND TRADEMARK OFFICE
CERTIFICATE OF CORRECTION

PATENT NO. : 7,252,479 B2
APPLICATION NO. : 11/140706
DATED : August 7, 2007
INVENTOR(S) : Bagai et al.

It is certified that error appears in the above-identified patent and that said Letters Patent is hereby corrected as shown below:

Column 8, line 33: "bade" should read as --blade--

Column 11, line 16: insert --main-- after "said" and before "rotor"

Signed and Sealed this

Sixth Day of November, 2007

JON W. DUDAS
*Director of the United States Patent and Trademark Office*